United States Patent [19]

Bagdal

[11] Patent Number: 4,662,708
[45] Date of Patent: May 5, 1987

[54] OPTICAL SCANNING SYSTEM FOR LASER TREATMENT OF ELECTRICAL STEEL AND THE LIKE

[75] Inventor: Karl T. Bagdal, Middletown, Ohio

[73] Assignee: Armco Inc., Middletown, Ohio

[21] Appl. No.: 545,080

[22] Filed: Oct. 24, 1983

[51] Int. Cl.$^4$ ............................................. G02B 26/10
[52] U.S. Cl. ...................................... 350/6.9; 350/6.5; 219/121 LS; 219/121 LW
[58] Field of Search ..................... 350/6.9, 6.5, 6.6, 6.7, 350/6.8; 219/121 LA, 121 LQ, 121 LR, 121 LS, 121 LW, 121 LH, 121 LM

[56] References Cited

U.S. PATENT DOCUMENTS

| | | | |
|---|---|---|---|
| 2,547,623 | 4/1951 | Cockrell | 350/6.6 |
| 2,692,003 | 10/1954 | Nieman et al. | 72/179 |
| 3,154,371 | 10/1964 | Johnson | 346/108 |
| 3,632,871 | 1/1972 | Watkins et al. | 350/6.9 |
| 3,781,078 | 12/1973 | Wildhaber | 350/6 |
| 4,028,525 | 6/1977 | Mominee et al. | 219/121 |
| 4,378,480 | 4/1983 | Langhem | 219/121 |
| 4,468,551 | 8/1984 | Neiheisel | 219/121 LR |
| 4,535,218 | 8/1985 | Krause et al. | 219/121 LH |

Primary Examiner—John K. Corbin
Assistant Examiner—Loha Ben
Attorney, Agent, or Firm—Frost & Jacobs

[57] ABSTRACT

Apparatus for scanning a laser beam across a moving strip of material. The strip is temporarily shaped by formed rollers to a concave shape to maintain a constant focus of the laser beam on the strip surface. The scanning assembly includes a mounting platform rotatable about a central axis. Mounted on the platform are a reflecting mirror, an optical element positioned within the path of the laser beam between the laser transmitter and the mirror, and a focusing lens for focusing the laser beam reflected from the mirror to a relatively small spot on the object. As the optics rotate with the platform, the beam emerging from the focusing lens is scanned across the surface of the strip. The optical element of the rotating platform first encountered by the laser beam may be a plano-convex lens, a plane reflecting mirror or a beam splitter. Multiple lasers and optics assemblies may also be utilized. The focusing lens may comprise multiple lens assemblies or a cylindrical lens for producing an elliptically shaped spot on the strip surface. The invention also finds utility in other applications where a laser beam must be scanned across the surface of an object.

40 Claims, 19 Drawing Figures

OPTICAL SCANNING SYSTEM FOR LASER TREATMENT OF ELECTRICAL STEEL AND THE LIKE

SUMMARY OF THE INVENTION

The present invention is directed to apparatus for scanning a laser beam across a surface, and more particularly to apparatus for scanning a laser beam across the surface of a moving electrical steel strip having an insulating coating thereon to improve core loss without damaging the insulative coating.

It has been found that the core loss of certain types of amorphous materials, cube-on-face oriented electrical steel (designated (100) [001] by Miller's indices) and cube-on-edge oriented silicon steels (110) [001] can be significantly improved by briefly irradiating the surface of the material with a laser. Such treatment introduces narrow zones with high dislocation density at or nearly 90° to the rolling direction. The stress fields associated with the zone serve to refine the spacing of the domain walls, resulting in a marked reduction of the core loss of the grain oriented electrical steel being treated. Typical types of steel which have been shown to be responsive to such laser treatments are described in U.S. Pat. Nos. 3,287,183; 3,636,579; 3,764,406; 3,873,381 and 3,932,324.

In order to produce the type of treatment contemplated to improve core loss, the laser beam produced by a continuous wave laser is scanned across the surface of the strip, giving rise to an "effective dwell time" of the laser spot on the surface of the strip which changes as a function of the scan rate and beam diameter at the irradiated surface. In other words, the effective dwell time or beam residence time is the time the focused spots spends at any point on the material surface. Thus, the energy delivered to a particular point on the strip surface can be obtained from this time and the average power.

Figure 19:
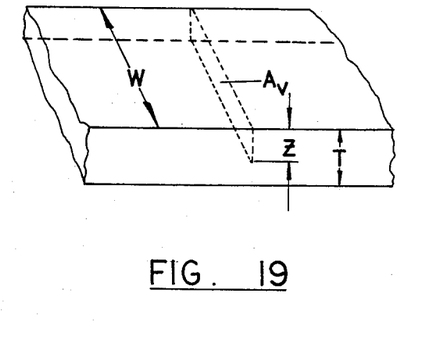
FIG. 19 is a fragmentary diagrammatic view of a portion of a strip treatable by the scanning assembly of the present invention.

The geometry associated with a relatively thin steel strip of indefinite length to be treated by the laser treating process described hereinabove is illustrated diagrammatically in FIG. 19. The width of the strip is designated W while the nominal thickness of the strip is indicated as T. When a laser beam is scanned transversely across the width W of the strip, heat penetration will occur in the strip to a depth Z. The energy associated with the laser beam and occuring within the vertical area $A_v$ may then be designated as $E/A_v$, or $E/WZ$ by mere substitution of the strip and depth of penetration.

It is well known that the energy value E can be expressed as the product of the power P produced by the laser beam and the scan time $t_{scan}$ required to move the beam across the width W of the strip. Similarly, the depth of penetration Z can be shown to be approximately equal to $[4\kappa\Delta t]^{\frac{1}{2}}$, where $\kappa$ is the thermal diffusivity and $\Delta t$ is the dwell time or residence time of the scanned spot at a particular location. As is well known, the thermal diffusivity is equal to the thermal conductivity divided by the product of density and specific heat capacity, and for silicon steel is equal to approximately 0.057 cm²/sec. Combining the aforementioned values, the energy unit per vertical area $E/A_v$ can be expressed as:

$$\frac{P\ t_{scan}}{2W\kappa\Delta t}$$

Another quality of interest is the power P produced by the laser beam per unit surface area A, P/A, as measured at the surface of the material being treated. It has been found that a minumum value of $E/A_v$ is necessary to produce the desired domain refinement in the material under treatment, while the maximum value of P/A must be limited to prevent damage to the insulative coating.

In a typical application of laser treatment to moving steel strip, the scan time $t_{scan}$ will be adjusted so that the beam traverses the entire strip width W and produces the required spacing between adjacent scan lines. Since the preferred embodiment of the present invention contemplates the use of a continuous wave laser, the required scan time also determines the value of the dwell time $\Delta t$. Consequently, since the thermal diffusivity $\kappa$ will be more or less constant for a given material, the magnitude of $E/A_v$ can be controlled through proper selection of the laser beam power P. However, the dwell time $\Delta t$ may also be regulated by controlling the repetition rate of the laser beam as it is scanned across the strip, e.g. by use of a pulsed laser.

It has been found that very short pulse widths on the order of 0.1 υsec. (e.g. as obtainable from a Q-switched laser) will produce coating damage when the surface energy density is sufficient to cause domain refinement. Longer dwell times alow the energy to diffuse further into the material affecting formation of the domain walls. However, too long a dwell time can cause physical distortions characterized by bowing of the strip and/or the development of linear surface impressions on the strip.

A high powered continuous wave Nd:YAG laser, capable of power outputs of 20 W to 600 W can be rapidly scanned to produce marked reductions in core loss in both regular grain oriented and high-permeability grain oriented electrical steels having a mill glass, an applied insulative coating, or both. Such a laser is particulary desirable for production applications because of its simpler design and control parameters, as compared to either a conventional pulsed or Q-switched Nd:YAG laser. More importantly, the insulative mill glass or applied coatings are unaffected by treatment with a continuous wave laser in association with the present invention and such treatment can be performed without the expense of recoating the strip.

In the practice of the present invention it has been determined that the focused spot diameter should be as small as possible. Excellent work has been achieved with laser beam spot diameters of from about 0.025 to about 1.5 mm. Excellent results have also been achieved with effective dwell times of from 0.003 msec to 0.65 msec. Line spacing on the surface of the coated silicon steel should be equal to or greater than about 2 mm. The line spacing, as defined in U.S. Pat. No. 4,293,350, for example, constitutes the distance between two adjacent lines plus the thickness of a line. An important factor affecting line spacing is the demand for high production line speeds. Finally, energy density of the laser beam per unit vertical surface area $(E/A_v)$ should be as large as possible to maximize domain refinement without damaging the insulative coating.

Further details associated with the laser treatment of electrical steels may be found in pending U.S. patent application Ser. No. 403,790 entitled "Laser Treatment of Electrical Steel and Optical Scanning Assembly Therefore" filed July 30, 1982 in the name of Gary L. Neiheisel and assigned to the assignee of the present application now U.S. Pat. No. 4,468,551.

The present invention is particularly directed to means for scanning the laser beam across the surface of the moving steel strip. In a first embodiment, a rotating platform with a horizontal axis of rotation e.g. a vertically oriented disc-like mounting platform, is positioned in closely-spaced overlying relationship with the upper surface of the strip. The platform is rotatable about an axis extending substantially parallel to the direction of travel of the strip, and is driven in a single direction at a relatively constant speed by means of an electric motor or the like. Mounted on the platform are a flat reflector, a first lens with its focal point lying on the axis of rotation of the platform so as to focus a beam from the laser onto the reflector and a second lens mounted on the platform adjacent the periphery thereof for focusing the laser beam reflected from the reflector onto the strip. A third lens having a focal point coincident with the focal point of the first lens is positioned between the laser and the first lens. Consequently, as the mounting platform is rotated, the laser beam is scanned across the width of the moving steel strip at a speed determined by the speed of rotation of the platform.

In the preferred embodiment, means are also provided for temporarily shaping the strip so as to cause it to assume a concave semi-cylindrical surface at the point at which the laser beam intersects the strip so that the distance between the second lens and the semi-cylindrical surface remains substantially constant as the platform rotates. As will be described hereinafter, this permits the point of focus on the strip surface to remain substantially constant, thereby delivering constant energy to the strip for treating it as described hereinabove.

In a second embodiment, a plurality of lenses and reflectors are mounted in a rotating optics mount. A plurality of lasers produce separate laser beams which are focused by each set of optics onto the moving steel strip. By properly selecting the number of optics sets, the entire width of the steel strip may be scanned in the space of a relatively small angular rotation of the mounting platform, for example 45°. The circular spot focused on the surface of the strip may also be modified by the use of a cylindrical lens to minimize the possibility of damaging the coating on the steel strip.

Alternate arrangements use different configurations of plane reflecting surfaces and focusing lenses to scan the laser beam across the width of the strip. In one alternate embodiment, semi-circular scan lines are produced on the surface of the strip by means of an optics mounting platform which is rapidly rotated about a vertically extending axis. A mask positioned between the scanning mechanism and the surface of the strip limits the zone actually scanned on the surface of the strip. A plurality of such units may be used side-by-side to cover the entire strip width. As another embodiment, a beam splitter may be used within the optics arrangement so as to reduce the actual rotational speed of the mounting platform, while maintaining the same scan rate across the surface of the strip.

As will become clear from the detailed description which follows, by curving the moving steel strip into a cylindrical shape, the use of very short focal length final lens systems can be used in the scanner system of the present invention. Furthermore, the scanning system described has the ability to cover large strip widths, while still requiring only low power lasers (such as the $TEM_{oo}$ mode of a continuous wave neodymium-YAG laser) since the final focusing lens system creates a very small, and therefore, a very intense circular irradiated spot on the strip. In addition, the small spot size of the laser beam on the strip also minimizes the fraction of the material volume which is damaged during the domain refinement process as described hereinabove.

While for purposes of an exemplary showing, the present invention has been described and illustrated in connection with scanning a laser beam across a moving steel strip as part of a domain refinement process to minimize core loss in electrical steels, it will be understood that the scanning system described can be used in any application that requires the creation of parallel lines on a product.

Further features of the invention will become apparent from the detailed description which follows.

DETAILED DESCRIPTION

Figure 1:
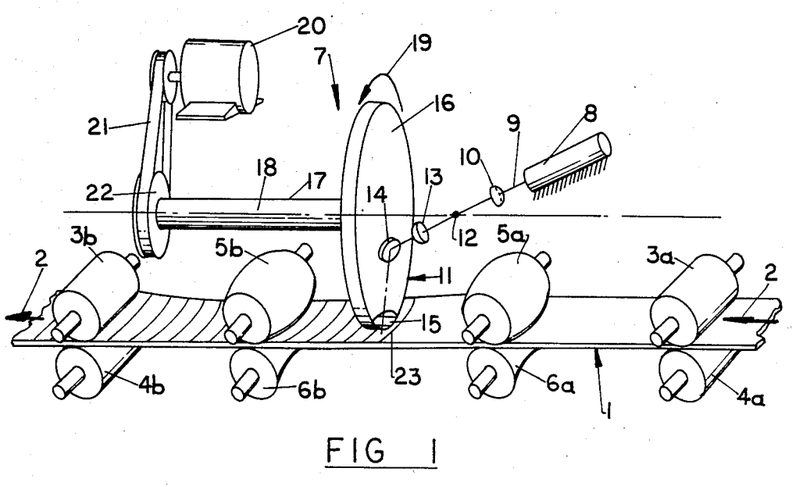
FIG. 1 is a diagrammatic view of a first embodiment of the scanning system of the present invention.

A preferred embodiment for optically scanning the laser beam across the width of a moving steel strip is illustrated in FIG. 1. A steel strip such as that described hereinabove is illustrated generally at 1. In a conventional routing, an indefinite length of strip 1 is moved in a straight line by means not shown in the direction of directional arrows 2 at a substantially constant speed. As the steel strip enters the treatment area to be described in detail hereinafter, it is supported by a pair of closely spaced rotatably mounted overlying rollers 3a and 4a. Upper roller 3a bears against the upper surface of strip 1, while lower roller 4a bears against the lower surface of the strip. As can be observed, rollers 3a and 4a are substantially cylindrical in shape so as to maintain the flatness of the moving strip.

As the strip approaches the treatment zone, it is supported by rollers 5a and 6a which are formed so as to elastically bow or shape the strip in a cylindrical shape as will be described in more detail hereinafter. For example, this may be accomplished by providing the upper formed roller 5a with a configuration wherein the center of the roll has a greater circumference than the outer ends of the roll, and by providing lower formed roller 6a of a configuration wherein the center of the roller has a circumference less than the circumference of the outer ends of the roll. A similar pair of overlying formed rollers 5b and 6b may also be provided on the downstream side of the treatment zone, as illustrated in FIG. 1, for example. It will be observed that strip 1 is caused to temporarily maintain its curved shape between the spaced pairs of formed rollers 5a and 6a and 5b and 6b, this constituting the treatment zone referred to herein.

Finally, spaced downstream from the second pair of formed rollers 5a and 6a is a second pair of generally cylindrical rollers 3b and 4b which serve to again flatten the strip 1 as it passes therebetween. The strip may then continue to additional processing stations, not shown.

A first embodiment of the scanning system of the present invention is illustrated generally at 7 in FIG. 1. Scanning system 7 includes a continuous wave ND:YAG laser 8 producing a monochromatic relatively thin optical laser beam 9. It is understood, however, that other types of lasers such as ND:glass, argon, alexandrite, $CO_2$, ruby, etc., producing a continuous or pulsed beam of suitable radiation energy, may also be utilized in connection with the present invention in order to produce the desired result, i.e. treatment of the electrical steel as described hereinabove.

The laser beam 9 is passed through fixed optics 10 and movable optics shown generally at 11. Fixed optics 10 is rigidly mounted to a fixed support, not shown, and comprises a plano-convex lens having a focal point designated at 12.

Movable optics 11 include a plano-convex lens 13 also having a focal point coincident with the focal point of lens 10 and lying at point 12. The laser beam 9 passed through lenses 10 and 13 is collimated on a flat reflecting mirror 14 which is angularly disposed with respect to the beam path so as to deflect the beam toward the moving strip 1. The laser beam so deflected is focused on the strip through a third lens 15.

As illustrated schematically in FIG. 1, lenses 13 and 15 and reflecting mirror 14 forming movable optics 11 are fixedly mounted to a vertically oriented disc-like optics mounting platform 16. It will be understood, however, that the particular means and method of attaching lenses 13 and 15, as well as reflecting mirror 14, to platform 16 have been omitted from FIG. 1 for clarity. In any event, the elements forming movable optics 11 will be secured to platform 16 so as to rotate with it. Mounting platform 16 is mounted to a horizontally extending shaft 17 which is rotatably supported by means not shown in order to permit the mounting platform 16 to rotate about an axis 18 extending horizontally and substantially parallel to the direction of travel of strip 1. It will be observed that focal point 12 associated with lenses 10 and 13 lies on the axis of rotation 18 of mounting platform 16.

The optics mounting platform 16 may be driven in the direction of directional arrow 19 at a relatively constant speed by an electrical motor 20 through the cooperation of a drive belt 21 and a sheave 22 fixedly secured to the opposite end of shaft 17.

In general, optical elements forming movable optics 11 serve to focus the laser beam 9 on the surface of moving strip 1 and to scan the focused laser beam across the width of the strip at the desired rate. It will be further observed that lens 15 receives substantially collimated light from lens 13, which is focused on the surface of the strip in a very small spot.

In a preferred embodiment, lens 15 may be mounted at or near the periphery of disc-like optics mounting platform 16, and the periphery of the mounting platform spaced a small distance from the upper surface of strip 1 so that lens 15 may have a very short focal length. In addition, by properly configuring the shape of shaped rollers 5a and 6a and 5b and 6b, the resulting concave shape of strip 1 in the treatment zone may be caused to be substantially semi-cylindrical, so that the distance between lens 15 and the upper surface of the strip remains substantially constant as optics mounting platform 16 is rotated. In other words, the central axis of the concave cylindrical shape of the strip coincides with the axis of rotation 18 of mounting platform 16. As a result, the laser beam 9 remains focused on the strip such that the energy delivered to the strip is substantially constant as the beam is scanned across the width of the strip.

As described hereinabove, the size of the resulting spot formed on the strip surface, as well as the dwell time of the spot on the strip (which is a function of scan speed) are selected to produce the desired amount of domain refinement in the electrical steel. In addition, the rotational speed of mounting platform 16 may be adjusted in relationship to the speed of the moving steel strip to produce the desired spacing between the narrow lines 23 of subdivided magnetic domains produced in the strip.

Figure 2:
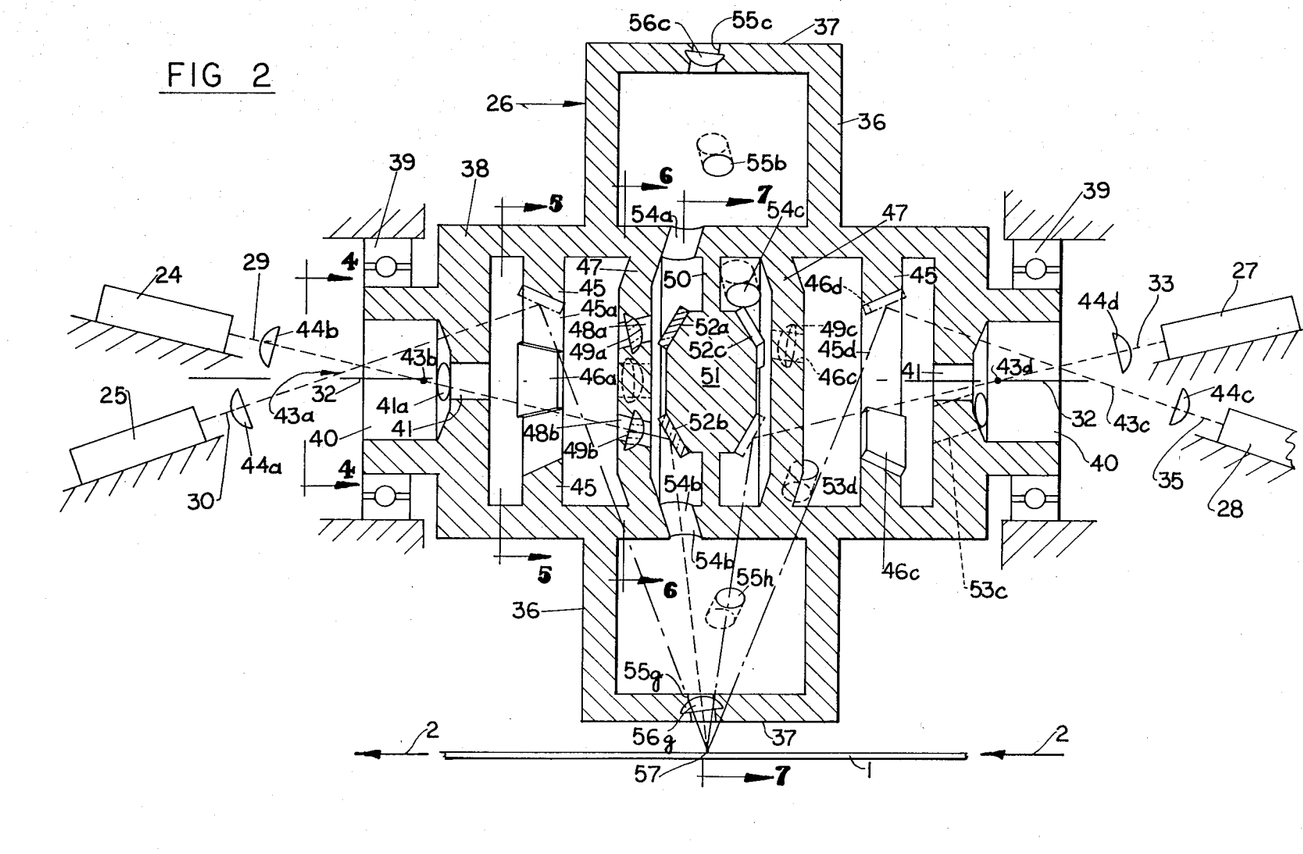
FIG. 2 is a partially schematic cross sectional elevational view of a second embodiment of the present invention with the mounting platform rotated such that the laser beam from laser 24 is focused on the strip.

A second embodiment of the present invention is illustrated in FIG. 2–FIG. 13 where elements similar to those previously described have been similarly designated. In this arrangement, the laser energy is provided at the surface of strip 1 by a plurality of laser transmitters, each employing its own set of fixed and rotating optics. In the arrangement shown, one pair of laser transmitters 24–25 is mounted on one side of the rotatable optics mount 26, while a second pair of laser transmitters 27-28 is mounted on the other side of optics mount 26. The laser beam paths in FIG. 2 are illustrated to show their projected travel only, since only beam 29 from laser 24 impinges on strip 1 when platform 26 is rotated to the position shown.

Laser transmitter 24 is mounted above laser transmitter 25 so that the laser beam 29 emerging from laser 24 is directed downwardly with respect to the direction of travel 2 of strip 1. Likewise, the lower laser transmitter 25 is oriented such that the laser beam 30 emerging therefrom is directed upwardly with respect to the direction of travel of the strip. Laser beams 29 and 30 are oriented to lie in the same plane as the axis of rotation 32 of optics mount 26.

Similarly, laser transmitter 27 is oriented so that the beam 33 emerging therefrom is directed downwardly with respect to the direction of travel of the strip while beam 35 emerges from laser 28 in an upwardly extending direction. Laser beams 33 and 35 are also oriented to lie in the same plane as laser beams 29 and 30 and axis of rotation 32.

Optics mount or platform 26 comprises a generally cylindrical wheel-like shell 36 having a flat circumferentially extending area 37. A cylindrical hollow hub 38 extends transversely through shell 36 so that axis of rotation 32 of the optics mount 26 coincides with the longitudinal central axis of hub 38. Hub 38 and hence optics mount 26 are rotatably mounted by means of suitable support bearings 39 affixed to the ends of the hub thereby permitting the optics mount to be freely rotated about central axis of rotation 32 by a suitable electric motor or the like, not shown, in the manner of the embodiment shown in FIG. 1.

Each end of hollow hub 38 is provided with an axially extending opening 40, the inner end of which terminates in an axially extending bore 41. The bottom of each bore 41 is counterbored as best shown in FIG. 2.

Figures 4, 5, 6, 7:
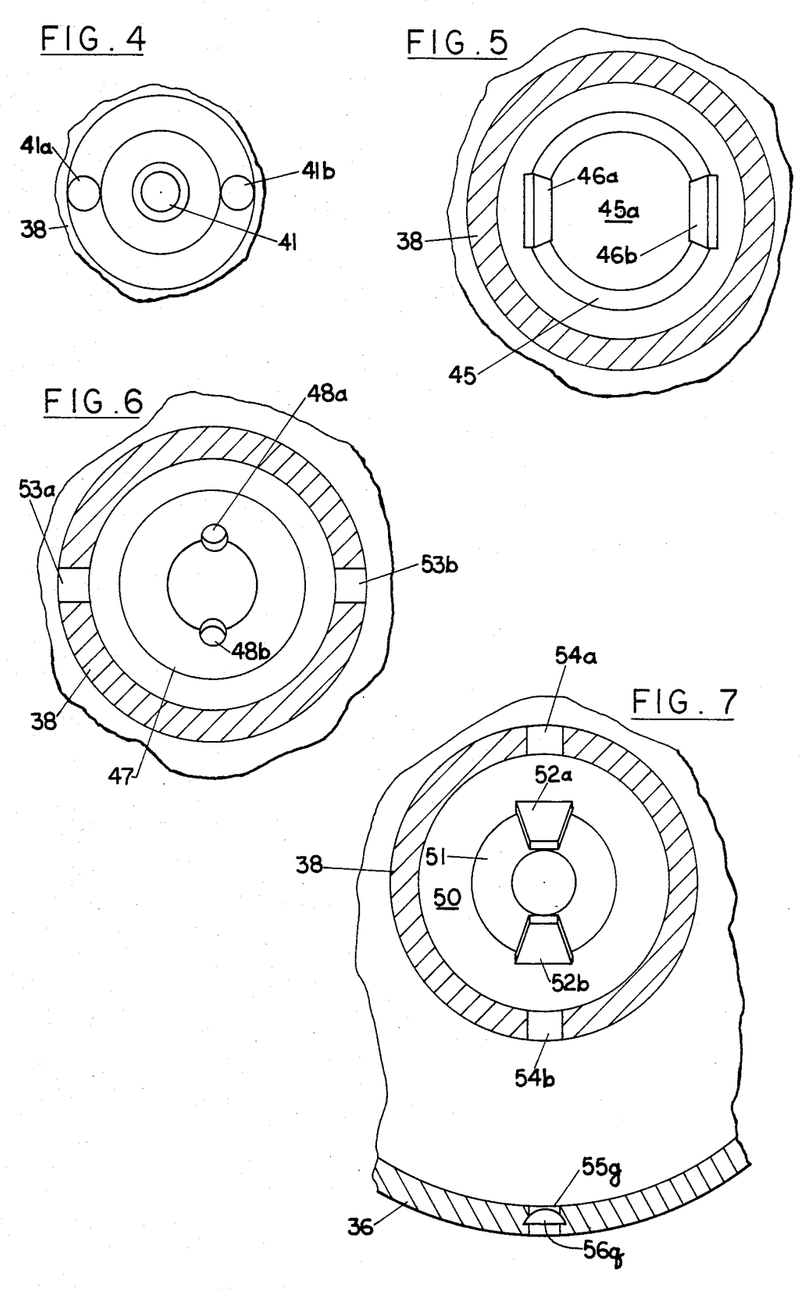
FIG. 4 is an end elevation view as viewed from line 4—4.
FIG. 5 is a fragmentary cross sectional view taken along section line 5—5.
FIG. 6 is a fragmentary cross sectional view taken along section line 6—6.
FIG. 7 is a fragmentary cross sectional view taken along section line 7—7.

The left-hand bore 41 as viewed in FIG. 2 contains a pair of spaced diametrically opposed through bores 41a and 41b positioned on each side of bore 41 (see FIG. 4). It will be observed when platform 26 is rotated to the position illustrated in FIG. 2, that a line passing diametrically through bores 41a and 41b is transverse to the direction of travel 2 of strip 1. Furthermore, when platform 26 is in the orientation illustrated in FIG. 2, laser beam 29 from laser 24 will be directed axially through bore 41b.

Figure 9:
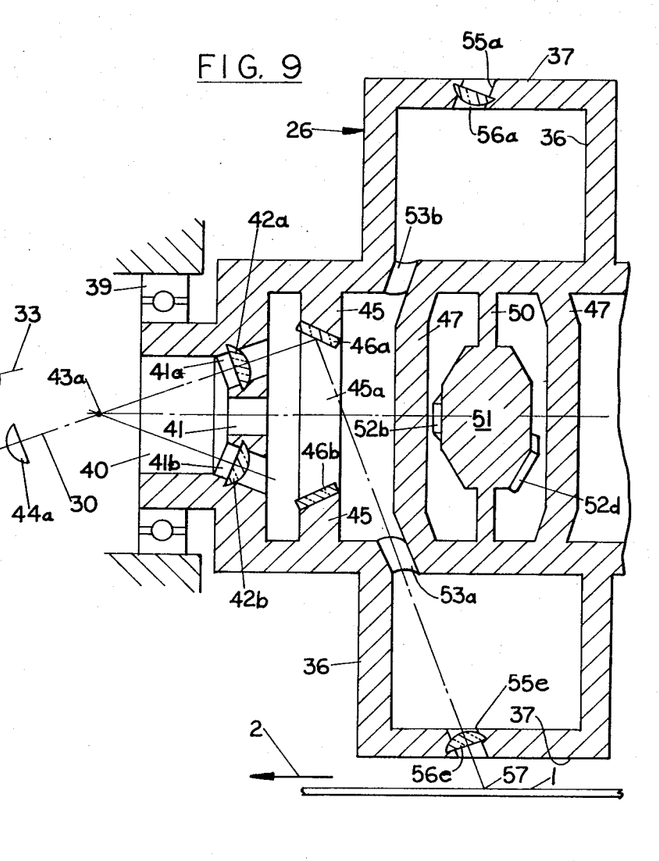
FIG. 9 is a fragmentary partially schematic cross sectional elevational view of the embodiment of FIG. 2 with the mounting platform rotated such that the laser beam from laser 25 is focused on the strip.

As best shown in FIG. 9, the axis of each of bores 41a and 41b is angularly disposed with respect to the axis of rotation 32 such that the outer end of each bore is closer to the axis of rotation than the inner end of the bore. In other words, when platform 26 is in the position illustrated in FIG. 2, laser beam 29 will pass through opening 41 and when platform 26 has rotated to the position illustrated in FIG. 9, laser beam 30 will pass through bore 41a.

Each of bores 41a and 41b mounts therein a plano-convex lens 42a and 42b, respectively. Each lens is positioned within its respective bore so that the focal point of the lens intersects axis of rotation 32. For example, as illustrated in FIG. 9, the focal point associated with lens 42a intersects axis of rotation 32 at a point 43a, while the focal point of lens 42b also intersects axis of rotation 32 at point 43a.

Laser transmitter 24 is provided with an associated fixedly mounted plano-convex lens 44b positioned within the path of laser beam 29 between the laser transmitter output and lens 49b to be described hereinafter.

Likewise, a fixedly mounted plano-convex lens 44a is associated with laser transmitter 25 and positioned within the path of laser beam 30 between the laser transmitter output and lens 42a. The focal point of lens 44a occurs at the point designated 43a lying on axis of rotation 32, which as previously described is also the focal point of lens 42a. The focal point of lens 44b lies on the axis of rotation 32 at point 43b. In summary, laser 24 is associated with the optical elements in the control plane (lenses 44b and 49b), while laser 25 is associated with the optical element in the outer plane (lenses 42a and 44a).

An annular rib 45 is spaced inwardly from bores 41a and 41b, and extends circumferentially around the inner periphery of hub 38 as best shown in FIG. 2 and FIG. 5. The central portion of rib 45 forms a circular opening 45a.

A pair of diametrically opposed trapezoidal-shaped flat reflecting mirrors 46a and 46b are angularly mounted on the inner face of rib 45 with respect to axis of rotation 32.

As best shown in FIG. 5, for the specific angular position of mounting platform 26 illustrated in FIG. 2, a line drawn diametrically through mirrors 46a and 46b is transverse to the direction of travel 2 of strip 1. Furthermore, for purposes of clarity, mirror 46a has been shown schematically shifted 90° out of position in FIG. 2 to illustrate the eventual path of travel of laser beam 30. It will also be observed that the angle of inclination of mirrors 46a and 46b is such that a laser beam impinging thereon is reflected toward the center of the flat circumferential area 37 of cylindrical shell 36.

A generally circular vertically extending mounting plate 47 is mounted inwardly of and parallel to rib 45. A pair of diametrically opposed bores 48a and 48b extend through plate 47 such that their central axes are inclined at approximately 45° with respect to axis of rotation 32. In other words, the outer opening of the bores is closer to the axis of rotation than the inner opening. As best shown in FIG. 6, a line drawn diametrically through bores 48a, 48b and axis of rotation 32 is perpendicular to the direction of travel 2 of strip 1. In other words, bores 48a and 48b are rotated 90° from bores 41a and 41b (see FIG. 4).

A plano-convex lens 49a and 49b, respectively, is provided within each of bores 48a and 48b. For purposes of explanation, one of lenses 49a or 49b has been rotated 90° and shown schematically in FIG. 2.

The median portion of hub 38 is provided with a circular mounting plate 50 mounting an outwardly directed circular mounting platform 51. As best shown in FIG. 2 and FIG. 7, mounting platform 51 mounts a pair of spaced diametrically opposed trapezoidal-shaped flat reflecting mirrors 52a and 52b. Each of mirrors 52a and 52b is inclined with respect to axis of rotation 32. This inclination permits a laser beam emitted by either laser transmitter 24 or 25 to be reflected toward the final focusing lenses. As illustrated in FIG. 7, a line passing diametrically through mirror 52a, mirror 52b and axis of rotation 32 will be perpendicular to the direction of travel 2 of strip 1. In other words, mirrors 52a and 52b are oriented in the same direction as bores 48a and 48b (see FIG. 6).

Figure 3:
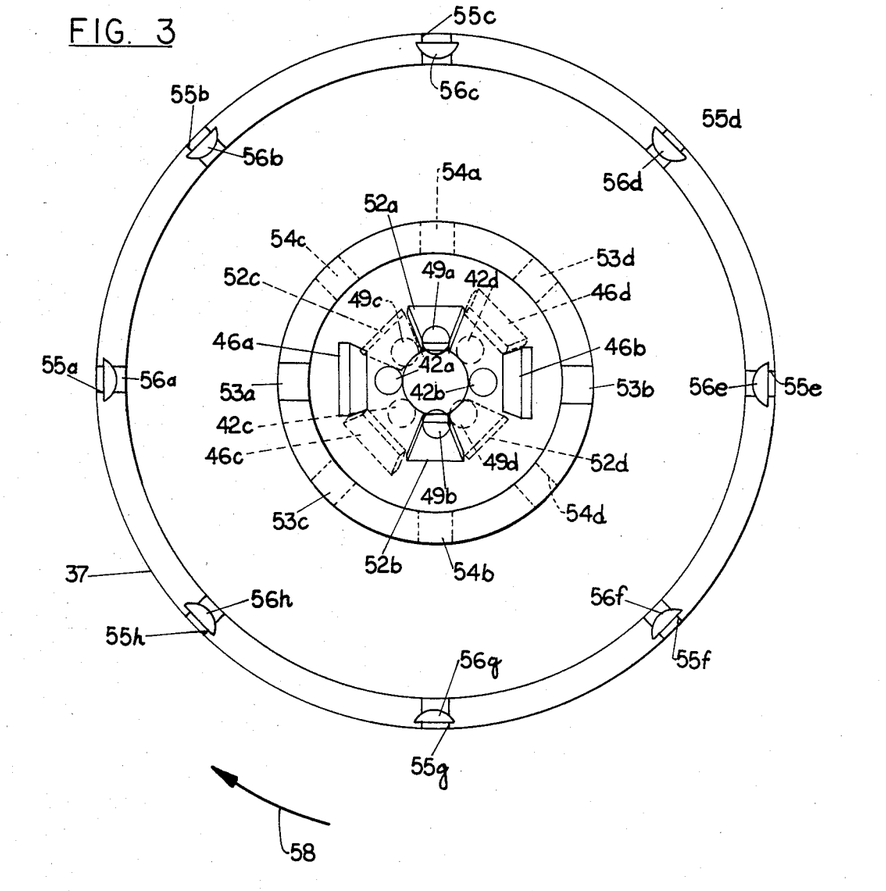
FIG. 3 is a diagrammatic end view of the embodiment of FIG. 2.

A pair of diametrically opposed bores 53a and 53b extend through hub 38 from the space between plates 45 and 47 to the hollow interior of cylindrical shell 36, as best shown in FIG. 3, FIG. 6 and FIG. 9. The axes of bores 53a and 53b are oriented at approximately 45° with respect to axis of rotation 32 so that a laser beam reflected from mirror 46a, for example, may pass coaxially through bore 53a. As illustrated in FIG. 3, bores 53a and 53b are arranged along the same diametric line as lenses 42a and 42b, and mirrors 46a and 46b.

As best shown in FIG. 2, FIG. 3 and FIG. 7, a pair of diametrically opposed bores 54a and 54b extend from the space between plates 47 and 50 into the hollow interior of cylindrical shell 36. The axes of bores 54a and 54b are inclined at approximately 45° with respect to axis of rotation 32. That is, as shown in FIG. 2, for example, laser beam 29 produced by laser transmitter 24 is deflected by mirror 52b coaxially through bore 54b toward strip 1. Furthermore, as best shown in FIG. 3, bores 54a and 54b are aligned along a diametric line containing mirrors 52a and 52b.

The right-hand portion as viewed in FIG. 2 of mounting platform 26 is arranged in a similar fashion to the left-hand portion, except that the sets of optics have been rotated about axis of rotation 32 45° with respect to their left-hand counterparts.

For example, right-hand bore 40 (as viewed in FIG. 2) contains a pair of spaced diametrically opposed through bores 41c and 41d positioned on each side of bore 41. It will be observed that when platform 26 is rotated to the position illustrated in FIG. 10, a line passing diametrically through bores 41c and 41d is perpendicular to the direction of travel 2 of strip 1. Furthermore, bores 41c and 41d are rotated 45° counterclockwise (as viewed in FIG. 3) from bores 41a and 41b located on the left-hand side of platform 26.

Figure 10:
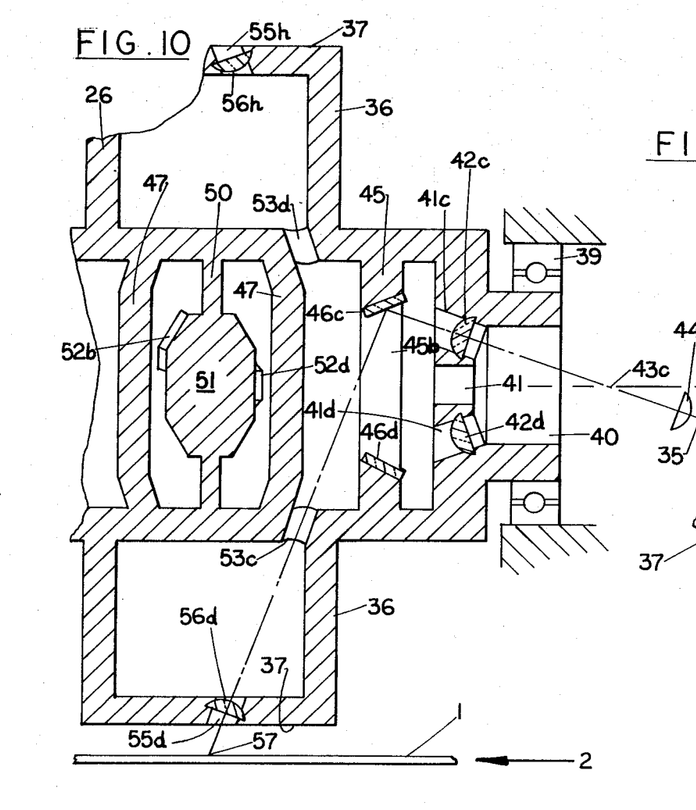
FIG. 10 is a fragmentary partially schematic cross sectional elevational view of the embodiment of FIG. 2 with the mounting platform rotated such that the laser beam from laser 28 is focused on the strip.

As best shown in FIG. 10, the axis of each of bores 41c and 41d is angularly disposed with respect to the axis of rotation 32 such that the outer end of each bore is closer to the axis of rotation than the inner end of the bore. In other words, when platform 26 is in the position illustrated in FIG. 10, the axis of bore 41c will be coaxial with laser beam 35.

Each of bores 41c and 41d mounts therein a plano-convex lens 42c and 42d, respectively (see FIG. 10). Each lens is positioned within its respective bore so that the focal point of the lens intersects axis of rotation 32. For example, as illustrated schematically in FIG. 10, the focal point associated with lens 42c intersects axis of rotation 32 at a point 43c, while the focal point of lens 42d also intersects axis of rotation 32 at the point 43c.

Laser transmitters 27 and 28 are each provided with an associated fixedly mounted plano-convex lens 44d and 44c, respectively, positioned within the laser beam path between the laser transmitter output and the associated lens 49d and 42c. The focal point of lens 44c occurs at the point designated 43c lying on axis of rotation 32, while the focal point of lens 44d lies on the point designated 43d on the axis of rotation.

In summary, laser 27 is associated with the optical elements in the central plane (lens 44d and 49d), while laser 28 is associated with the optical elements in the outer plane (lenses 44c and 42c).

Figure 8:
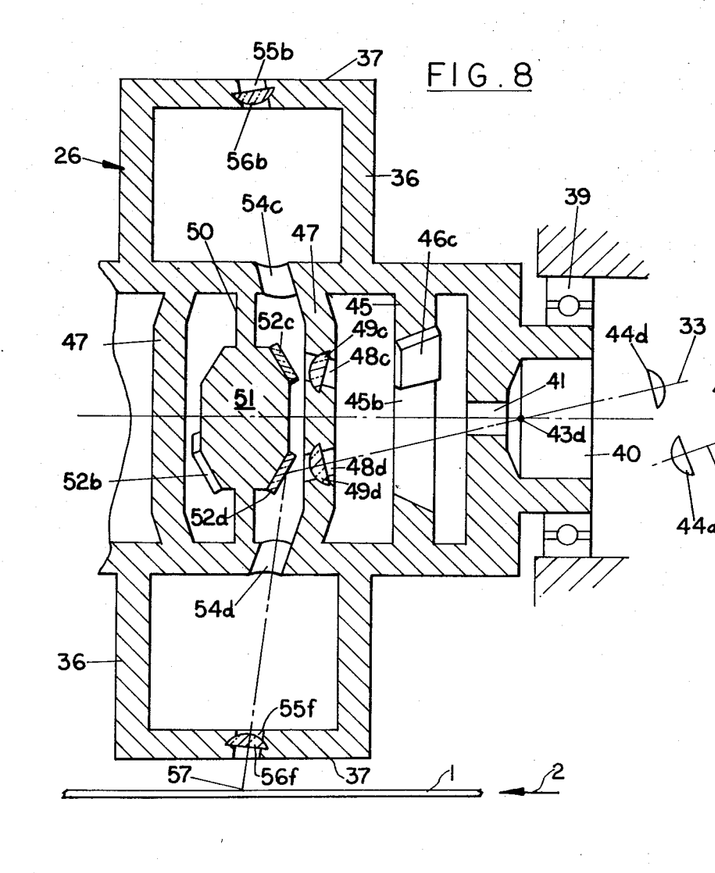
FIG. 8 is a fragmentary partially schematic cross sectional elevational view of the embodiment of FIG. 2 with the mounting platform rotated such that the laser beam from laser 27 is focused on the strip.

A second annular rib 45 is spaced inwardly from bores 41c and 41d, and extends circumferentially around the inner periphery of hub 38 as best shown in FIG. 2, FIG. 8 and FIG. 10. The central portion of rib 45 forms a circular opening 45b.

A pair of diametrically opposed trapezoidal-shaped flat reflecting mirrors 46c and 46d are angularly mounted on the inner face of right-hand rib 45 with respect to axis of rotation 32.

For the particular angular position of platform 26 illustrated in FIG. 10, a line drawn diametrically through mirrors 46c and 46d is perpendicular to the direction of travel 2 of strip 1. Furthermore, for purposes of clarity, mirror 46d has been shown schematically shifted 90° out of position in FIG. 2 to illustrate the eventual path of travel of laser beam 35. It will also be observed that the angle of inclination of mirrors 46c and 46d is such that a laser beam impinging thereon is reflected toward the center of the flat circumferential area 37 of cylindrical shell 36, and more particularly toward final focusing lenses 56b and 56h, respectively. As can be seen in FIG. 3, mirrors 46c and 46d are shifted counterclockwise (as viewed from the left end of platform 26) from mirrors 46a and 46b.

A second generally vertically extending mounting plate 47 is mounted inwardly of and parallel to right-hand rib 45. A pair of diametrically opposed bores 48c and 48d extend through right-hand plate 47 such that their central axes are inclined at approximately 45° with respect to axis of rotation 32. In other words, the outer opening of the bores is closer to the axis of rotation than the inner openings. As best seen in FIG. 8, a line drawn diametrically through bores 48c, 48d and axis of rotation 32 is perpendicular to the direction of travel 2 of strip 1. In other words, bores 48c and 48d are rotated 90° from bores 41b and 41c.

A plano-convex lens 49c and 49d, respectively, is provided within each of bores 48c and 48d.

The right-hand portion of mounting plate 50 also mounts an outwardly directed second circular mounting platform 51. As best shown in FIG. 2 and FIG. 8, mounting platform 51 mounts a pair of spaced diametrically opposed trapezoidal-shaped flat reflecting mirrors 52c and 52d. One of mirrors 52c and 52d have been shown rotated out of position in FIG. 2 for purposes of explanation in connection with the eventual path of laser beam 33. Each of mirrors 52c and 52d is inclined with respect to axis of rotation 32. This inclination permits a laser beam emitted by either laser transmitter 27 or 28 to be reflected toward the final focusing lenses. As illustrated in FIG. 8, the line passing diametrically through mirror 52c, mirror 52d and axis of rotation 32 will be perpendicular to the direction of travel 2 of strip 1.

A pair of diametrically opposed bores 53c and 53d extend through the right-hand portion of hub 38 from the space between plates 45 and 47 to the hollow interior of cylindrical shell 36, as best shown in FIG. 3, and FIG. 10. The axes of bores 53c and 53d are oriented with respect to axis of rotation 32 so that the laser beam reflected from mirror 46c, for example, may pass co-axially through bore 53c. As illustrated in FIG. 3, bores 53c and 53d are arranged in the same radial plane as lenses 42c and 42d and mirrors 46c and 46d.

As best shown in FIG. 3 and FIG. 8, a pair of diametrically opposed bores 54c and 54d extend from the right-hand space between plates 47 and 50 into the hollow interior of cylindrical shell 36. The axes of bores 54c and 54d are inclined with respect to axis of rotation 32. That is, as shown in FIG. 8, for example, laser beam 33 produced by laser transmitter 27 is deflected by mirror 52d coaxially through bore 54d toward strip 1. Furthermore, as best shown in FIG. 3, bores 54c and 54d are aligned in the radial plane containing mirrors 52c and 52d.

Eight equally spaced radially extending bores 55a–55h are spaced circumferentially around outer surface 37. Each of bores 55a-55h is positioned along the median of surface 37 so as to permit the laser beam reflected from the various internal optical components to pass through the bore onto the upper surface of moving strip 1. It will be observed that the axes of bores 55a, 55c, 55e and 55g are inclined toward the left-hand portion of platform 26, as viewed in FIG. 2, while the axes of bores 55b, 55d, 55f and 55h are inclined toward the right-hand portion of platform 26, as viewed in FIG. 2.

Each of bores 55a-55h is provided with a corresponding plano-convex lens 56a-56h which serves to focus the appropriate laser beam to a point 57 on the upper surface of moving strip 1. As will be explained in more detail hereinafter, only one of laser beams 29, 30, 33 and 35 impinges on the surface of strip 1 at any time; however, each of the laser beams is focused through the appropriate final focusing lens to the same point 57 as viewed in FIG. 2.

The scanning sequence of the embodiment just described in FIG. 2-FIG. 13 will now be illustrated in more detail. It will be assumed that mounting platform 26 is rotating at a constant speed in a clockwise direction as viewed from the left end of the platform illustrated in FIG. 2. That is, mounting platform 26 is rotating in the direction of directional arrows 58 in FIG. 3 and FIGS. 11-13.

Figures 11, 12, 13:
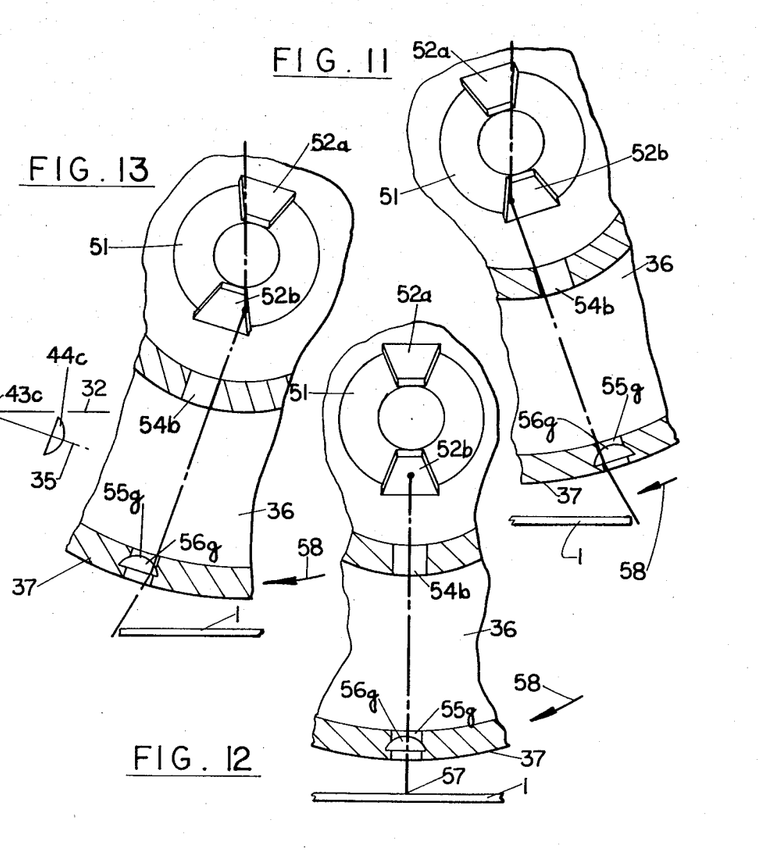
FIG. 11–FIG. 13 are fragmentary cross sectional views taken along section line 7-7 of FIG. 2 showing the mounting platform in three successive positions as it scans across the strip.

At a particular instant in time, mounting platform 26 assumes the rotational position illustrated in FIG. 2, as shown in more detail in FIG. 11, where the laser beam 29 from laser transmitter 24 is just beginning to impinge on the right-hand edge of strip 1, as viewed in FIG. 11. For this condition, laser beam 29 passes through lens 44b, opening 41, lens 48b, mirror 52b, opening 54b and lens 56g. As rotation of the mounting platform continues, the laser beam is swept across the surface of strip 1 from right to left as viewed in FIG. 11-FIG. 13. When the beam has traversed half the distance of the strip, the condition illustrated in FIG. 12 is present where the laser beam is directed straight down co-axially with bore 54b. As the scanning continues, the condition in FIG. 13 occurs just as the beam leaves the left-hand edge of the strip as illustrated in FIG. 13. At this point, the next successive laser beam is just beginning to impinge on the right-hand edge of the strip as will be explained in more detail hereinafter.

From FIGS. 11-13, it is apparent that the width of mirrors 52a and 52b, and the width of bore 54b must be such as to accommodate the slight angular deviation of the laser beam as it is scanned across the strip. It will further be observed that the laser beam completely traverses strip 1 during approximately 45° of mounting platform rotation.

The next successive laser beam scan is illustrated in FIG. 8, where the mounting platform 26 has rotated 45° from the initial condition illustrated in FIG. 2. Here the laser beam 33 produced by laser transmitter 27 is directed through lens 44d, opening 41, lens 49d mirror 52d and final focusing lens 56f. Again, the laser beam will be swept across the upper surface of strip 1 in approximately 45° of mounting platform rotation.

The situation for the next successive laser beam scan is illustrated in FIG. 9, where the mounting platform has rotated 90° from the initial condition illustrated in FIG. 2. Here the laser beam 30 produced by laser transmitter 25 is directed through lens 44a, lens 42a, mirror 46a, opening 53a and final focusing lens 55e. During the successive 45° of mounting platform rotation, the laser beam traverses the width of the upper surface of strip 1.

The fourth successive laser beam scan is illustrated in FIG. 10, where the mounting platform has rotated 135° from the initial condition illustrated in FIG. 2. In this situation, the laser beam 35 produced by laser transmitter 28 passes through lens 44c, lens 42c, mirror 46c, opening 53c and final focusing lens 56d. During the succeeding 45° of mounting platform rotation, the laser beam is swept across the width of the upper surface of strip 1. Consequently, at the end of the scan illustrated in FIG. 10, four successive laser scans have been produced on the surface of strip 1, and mounting platform 26 has rotated 180° from its initial position illustrated in FIG. 2.

The next scan again utilizes the laser beam 29 produced by laser transmitter 24, and the optical path formed by lens 44b, opening 41, lens 49a, mirror 52a, opening 54a, and final focusing lens 56c.

The succeeding scan uses laser beam 33 produced by laser transmitter 27 and the optical path formed by lens 44d, opening 41, lens 49c, mirror 52c, opening 54c and final focusing lens 56b.

The next succeeding laser scan utilizes laser beam 30 produced by laser transmitter 25, and the optical path formed by lens 44a, lens 45b, mirror 46b, opening 53b, and final focusing lens 56a.

The final scan to complete one complete rotation of the mounting platform utilizes laser beam 35 produced by laser transmitter 28, and the optical path formed by lens 44c, lens 42d, mirror 46d, opening 53d and final focusing lens 56h.

At this point it will be understood that the mounting platform has completed one complete revolution, while producing eight successive laser scans across the upper surface of strip 1. At the same time, each of the laser beams produced by the four laser transmitter has been utilized twice. That is, beam 29 from transmitter 24 is utilized for angular rotations of mounting platform 26 comprising 0-45° and 180-225° ; laser beam 33 from transmitter 27 for angular rotations of 45-90° and 225°-270° ; laser beam 30 from laser transmitter 25 for angular rotations of 90°-135° and 270°-315° ; and laser beam 35 from laser transmitter 28 for angular rotations of 135°-180° and 315°-360°.

It will be apparent that the direction of rotation of mounting platform 26 may be reversed to change the direction of scan across the width of the strip. Furthermore, it will be observed that the relative orientation of the optics forming the left-hand optical paths may be rotated about the axis of rotation with respect to the optics forming the right-hand optical paths such that the order of the laser beams scanning the strip surface is changed. For example, in the embodiment illustrated, the strip width is scanned for every 45° of optics mount rotation. Adding more sets of optics and/or more laser transmitters permits the width of the strip to be scanned more often during a single rotation of the optics mount. It will be further observed that as the number of sets of optical elements and/or laser transmitters increases, the necessary degree of bowing of the strip 1 is reduced. That is, for the embodiment illustrated and described hereinabove, strip 1 must be bowed to accommodate 45° of mounting platform rotation for each scan line, in order to keep the distance between the final focusing lenses and the upper surface of strip 1 constant. However, if the relative rotation of mounting platform 26 per scan can be reduced, the degree of strip bowing can also be reduced.

Figure 14:
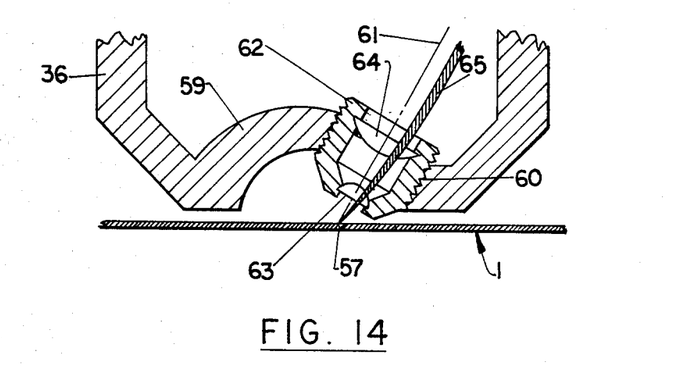
FIG. 14 is an enlarged fragmentary cross sectional view of an alternate embodiment for the final focusing lens arrangement of the scanning system of FIG. 2.

FIG. 14 illustrates an alternate arrangement for mounting the final focusing lenses 6a–6h on optics mount 26, where elements similar to those previously described have been similarly designated. In this arrangement, the periphery of cylindrical shell 36 is formed in a generally concave mounting surface, designated 59 in FIG. 14. Mounting surface 59 is provided with threaded bores 60, the central axis of which is angularly inclined with respect to the surface of strip 1. In other words, the central axis 61 of threaded bores 60 is oriented angularly with respect to a line normal to strip 1.

Each of bores 60 is provided with a generally cylindrical mounting sleeve 62 having an outer surface which threadedly engages threaded bore 60. A pair of spaced plano-convex focusing lenses 62 and 63 are rigidly mounted within sleeve 62 so as to focus the respective laser beam 65 at point 57 on moving strip 1 as previously described. It will be observed that the use of a multi-element final lensing system permits the system to achieve focal lengths much shorter than would normally be practical with a single lens system. Consequently, the final focusing lens 63 may be placed much closer to the surface of moving strip 1 to insure that the maximum energy per unit area is delivered to the surface of the strip.

Figure 15:
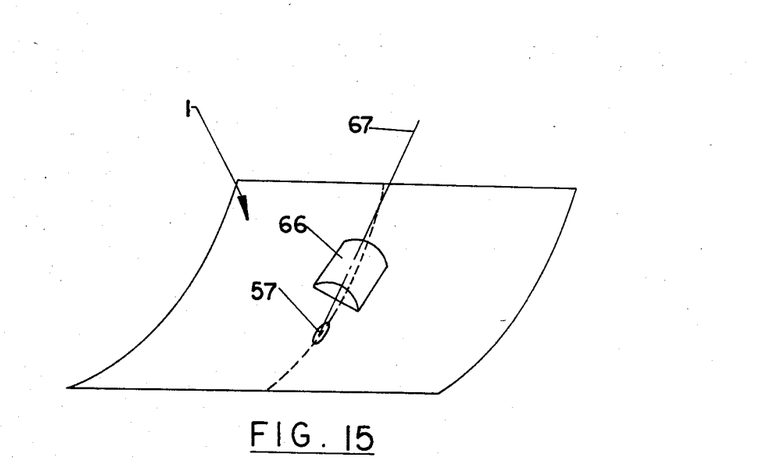
FIG. 15 is a diagrammatic view of an alternate embodiment for the final focusing lens arrangement of the embodiment of FIG. 2.

FIG. 15 illustrates schematically another embodiment of the invention where each of the single =element lenses 56a–56h of the embodiment of FIG. 2–FIG. 13 has been replaced by a cylindrical plano-convex lens 66. It will be observed in this arrangement that the laser beam, shown diagrammatically at 67, after passing through cylindrical lens 66, produces an elliptical shaped spot 57 on the surface of strip 1, rather than the circular-shaped spot produced in the embodiments previously described. The cylindrical lens is arranged so that the major or long axis of elliptically shaped spot 57 is aligned parallel to the direction of scan of the spot across the width of the strip 1. The use of an elliptical spot permits the strip to be heated with less intensity than would occur with a circular spot, while heating the metal strip for a longer period of time. Consequently, the elliptical-shaped spot accomplishes the same result as the circular spot, but is not as likely to damage any coating that may be associated with the strip as a result of high heating rates.

Figure 16:
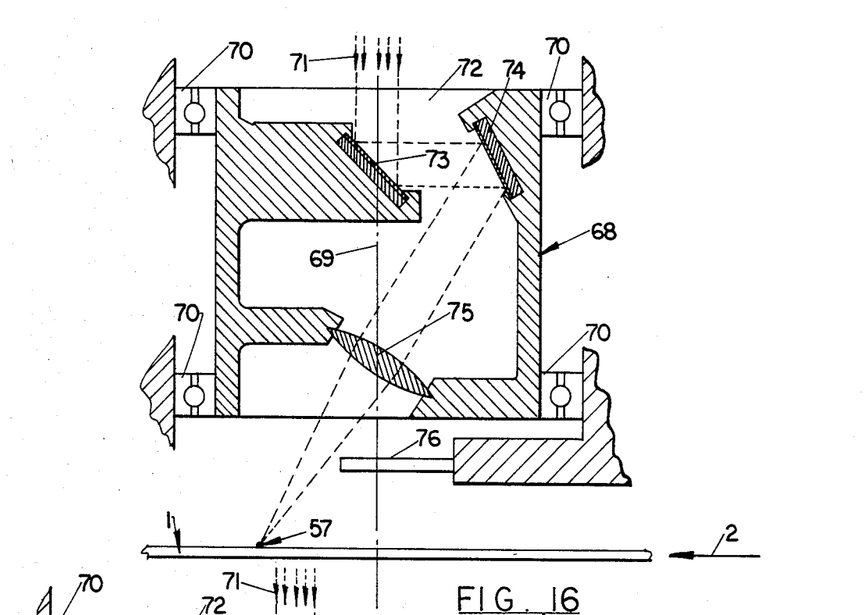
FIG. 16 is a partially diagrammatic cross sectional elevational view of a third embodiment of the scanning system of the present invention.

FIG. 16 illustrates another embodiment of the present invention where elements similar to those previously described have been similarly designated. In this arrangement, all of the movable optics are mounted on a generally cylindrical optics mount, shown generally at 68. Optics mount 68 is supported so as to be rotatable about a vertically extending axis of rotation 69 by means of a pair of vertically spaced support bearings 70. As in the previous embodiments, it will be understood that optics mount 68 may be rotated at the desired speed about axis of rotation 69 by an electric motor or the like, not shown.

An expanded laser beam 71 produced by a laser transmitter (not shown) is coaxial with axis of rotation 69 and enters optics mount by means of an opening 72 at the top of the mount. The downwardly directed laser beam is then deflected horizontally and to the right as viewed in FIG. 16 by means of an angularly mounted reflecting mirror 73.

The laser beam is then reflected downwardly and toward axis of rotation 69 by means of a second angularly mounted reflecting mirror 74. The reflected laser beam is then focused onto point 57 of moving steel strip 1 by means of a plano-convex final focusing lens 75.

To insure that the laser beam scanned across the surface of strip 1 describes an arc, rather than a complete circle, a horizontally extending plate-like mask 76 extends between the lower end of optics mount 68 and the upper surface of strip 1. Consequently, only a portion of the total scan of the laser beam will actually impinge on the surface of the moving strip, the remainder being blocked by mask 76.

Figure 17:
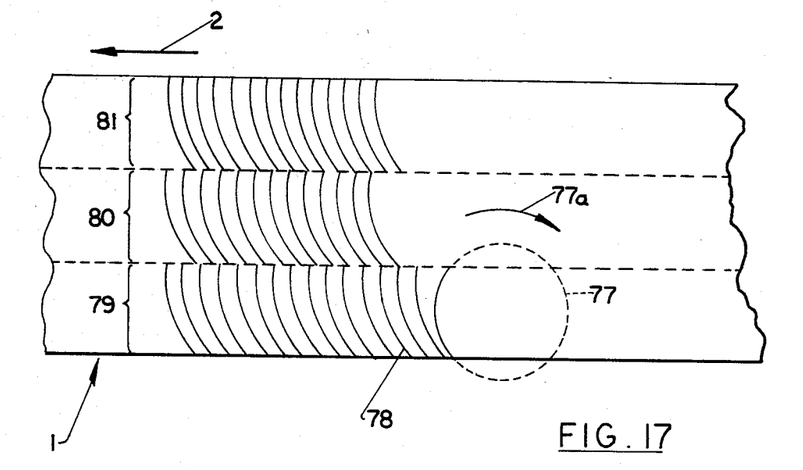
FIG. 17 is a plan schematic view illustrating the scanning configuration for the embodiment of FIG. 16.

This effect is illustrated more clearly in FIG. 17, which shows a top plan view of the moving strip and the scan lines produced by the scanning apparatus of FIG. 16. It will be observed that without mask 76 in place, the scanned laser beam would describe a circular area, represented by the dashed lines 77. However, with mask 76 in place, and the scanner rotating in the direction of arrow 77a, the scanned laser beam produces a plurality of spaced semi-circular segments (i.e. portions of a cycloid), one of which is illustrated at 78, which extend in the direction of strip travel and part way across the width of the strip. Since the scanned beam does not cover the full width of the strip in this embodiment, several of the scanning devices illustrated in FIG. 16 must be placed side-by-side so as to produce adjacent sets of scanned lines, designated 79–81 in FIG. 17. For the particular conditions illustrated, three units 68 placed side-by-side would be necessary to cover the entire strip width.

Figure 18:
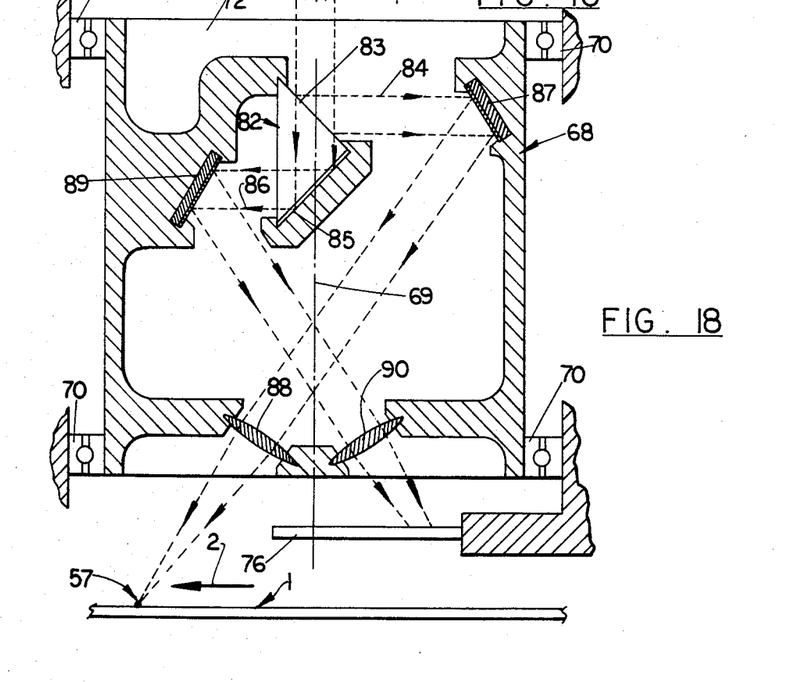
FIG. 18 is a partially schematic cross sectional elevation view of a fourth embodiment of the scanning system of the present invention.

A further embodiment of the present invention is illustrated in FIG. 18, where elements similar to those previously described have been similarly designated. In this arrangement, laser beam 71 is directed through the opening 72 at the top of optics mount 68 onto a beam splitter 82. A portion of laser beam 71 is reflected by half silvered surface 83 along laser beam path 84, while the remainder of laser beam 71 passes through half silvered surface 83 and is reflected from fully silvered inner surface 85 along a lower laser beam path 86.

The reflected laser beam 84 is further reflected from an angularly mounted reflecting mirror 87 through a final focusing lens 88 onto spot 57 on the surface of moving strip 1. At the same time, reflected laser beam 86 is deflected by an angularly mounted mirror 89 through a final focusing lens 90. When optics mount 68 is rotated 180°, it will be observed that the laser beam focused through lens 90 will also be focused on moving strip 1. As in the embodiment previously described in connection with FIG. 16, mask 76 limits the path of the laser beam to a semi-circular area on the surface of the strip. It will be appreciated that the use of multiple focusing lenses in combination with the prism and reflecting mirror system described permits the laser beam to be scanned across the surface of the strip while maintaining a reasonable speed of rotation of optics mount 68. Furthermore, final focusing lenses 88 and 90 may be replaced by the cylindrical lens of FIG. 15 to produce an elliptical shaped spot. In this arrangement, the strip must be maintained flat since the focus of points in the focal plane of the lens lie on the surface of the strip.

It will be understood that various changes in the steps, materials, details and arrangements of parts, which have been herein described and illustrated in order to explain the nature of the invention, may be used within the principle and scope of the invention as expressed in the appended claims.

While the present invention has been described and illustrated in connection with scanning a laser beam across a moving steel strip as part of a domain refinement process to minimize core loss in electrical steels, it will be understood that the scanning system described can be used in any application that requires the creation of parallel lines on an object or product, whether or not the product is a flat strip. Consequently, the present invention finds particular utility for laser material treatment or processing applications to affect some type of beneficial change in the material such as welding, alloying, heat treating, drilling, cutting, scribing, surface abrading, etc.

The embodiments of the invention in which an exclusive property or privilege is claimed are as follows:

1. An assembly for repetitively scanning a laser beam across an object comprising:
   a mounting platform rotatable about a central axis of rotation;
   means for rotating said platform about said axis;
   at least one laser transmitter mounted with respect to said platform such that said laser beam is non-parallel with said axis of rotation;
   first means for focusing said laser beam on said axis of rotation to form a point of intersection; and
   optics means mounted on said platform for focusing said laser beam onto said object including:
      a reflecting mirror;
      an optical element positioned between said mirror and the point of intersection of said laser beam and said axis of rotation for directing a part at least of said laser beam onto said mirror; and
      a focusing lens positioned within the path of said laser beam between said mirror and said object for focusing said laser beam to a spot on said object,
   whereby said optic means rotates with said platform and the focused laser beam emergent from said lens is scanned across said object as said platfrom rotates.

2. The assembly according to claim 1 wherein said optical element comprises at least one lens having its focal point coinciding with said point of intesection of the laser beam with said axis of rotation.

3. The assembly according to claim 2 wherein said first focusing means comprises a second lens.

4. The assembly according to claim 1 wherein said object defines an indefinite length strip moving in a horizontal path at a substantially constant speed, said mounting platform being oriented such that the axis of rotation is aligned with the path of travel of the strip so as to scan said laser beam across the width of the strip.

5. The assembly according to claim 4 wherein said mounting platform comprises a generally vertically extending disc-like plate overlying said strip such that the peripheral edge of said plate is closely spaced to one major surface of the strip, said mirror being spaced from said axis of rotation, said lens being positioned adjacent the periphery of said plate.

6. The assembly according to claim 5 including means for forming said strip to an arcuate shape in the area adjacent the periphery of said plate such that the laser beam path between said focusing lens and said strip surface remains substantially constant.

7. The assembly according to claim 6 wherein said forming means comprises at least one pair of closely spaced overlying rollers, the upper one of said rollers bearing against the upper surface of the strip and having a circumference at the median portion of the roller greater than the circumference at the extremities of the roller, the lower one of said rollers bearing against the lower surface of the strip and having a circumference at the median portion of the roller less than the circumference at the extremities of the roller, said rollers cooperating to elastically bend the strip to said arcuate shape.

8. The assembly according to claim 7 wherein said first focusing means comprises a second lens.

9. The assembly according to claim 2 wherein said focusing lens comprises a pair of spaced lenses forming a focusing lens assembly to provide a shorter focal length and a higher energy per unit area on the object surface.

10. The assembly according to claim 2 wherein said focusing lens comprises a cylindrical lens for producing an elliptically shaped focused spot on the object having its longest axis extending in the scan direction.

11. The assembly according to claim 1 wherein said optical element comprises a reflecting mirror.

12. The assembly according to claim 11 wherein said assembly includes mask means positioned between said platform and said object for limiting the area scanned on said object by said laser beam.

13. The assembly according to claim 11 wherein said axis of rotation extends perpendicularly to said object.

14. The assembly according to claim 13 wherein said platform comprises a generally cylindrical shell, the central axis of said shell coinciding with said axis of rotation, means for rotatably mounting said shell, said optical element being mounted on said axis of rotation, said second mirror being spaced from the axis of rotation, said lens being angularly mounted on said axis of rotation such that the scanned beam forms a circular pattern on said object.

15. The assembly according to claim 14 including a plate-like mask extending partially between said platform and said object, said mask being positioned so that semi-circular scan lines are formed on said object.

16. The assembly according to claim 15 wherein said object comprises an indefinite length strip moving in a generally horizontal path at a substantially constant speed, said mounting platform being oriented such that the axis of rotation is substantially perpendicular to the path of travel of the strip.

17. The assembly according to claim 16 wherein said final focusing lens comprises a cylindrical lens for producing an, elliptically shaped focused spot on the strip having its longest axis extending in the scan direction.

18. The assembly according to claim 1 wherein said object includes an indefinite length strip moving in a generally horizontal path at a substantially constant speed, said mounting platform being oriented such that the axis of rotation is substantially perpendicular to the path of travel of the strip.

19. The assembly according to claim 1 including a plate-like mask extending partially between said platform and said object, said mask being positioned so that semi-circular scan lines are formed on said object.

20. The assembly according to claim 1 wherein said focusing lens comprises a pair of spaced lenses forming a focusing lens assembly thereby permitting said lens assembly to be positioned closer to the object.

21. The assembly according to claim 1 wherein said focusing lens comprises a cylindrical lens for producing an elliptically shaped focused spot on the object having its longest axis extending in the scan direction.

22. An assembly for repetitively scanning a laser bean across an object comprising:

a. a plurality of fixedly mounted laser transmitters producing separate laser beams;
b. a mounting platfrom rotatable about a central axis of rotation;
c. means for rotating said platform about said axis; and
d. optic means mounted on said platform for sucessively focusing each of said laser beams onto said object comprising:
   i. reflecting mirrors;
   ii. an optical element positioned within the path of each of said laser beams between each of said laser transmitters and each of said mirrors for directing a part at least of each of said laser beams onto each of said mirror; and
   iii. a focusing lens positioned within the path of each of said laser beams between each of said mirrors and said object for focusing each of said laser beams to a spot on said object,
   whereby said optic means rotates with said platform and the focused laser bean emergent from said lens is scanned across said object as said platform rotates.

23. 10. The assembly according to claim 22 wherein said optics means is operable to produce a plurality of scans for each laser during each rotation of the platform.

24. The assembly according to claim 22 wherein said platform comprises a generally cylindrical shell having a peripherally extending mounting surface, said axis of rotation being substantially co-axial with the axis of said shell, a plurality of said optics means including reflecting mirrors mounted within said shell and radially spaced from said axis, a plurality of optical elements comprising lenses mounted within said shell and radially spaced from said axis, and a plurality of focusing lenses circumferentially spaced along said mounting surface, wherein a laser beam from each of said laser transmitters is successively focused on and scanned across the surface of said object through an optical path comprising one of said mirrors, optical elements and focusing lenses.

25. The assembly according to claim 24 wherein said laser transmitters and the mirrors and optical elements associated therewith are positioned at opposite axial ends of said shell.

26. The assembly according to claim 24 wherein each axial end of said shell includes first and second laser transmitters, a first pair of diametrically opposed optical elements and a first pair of diametfically opposed mirrors optically associated therewith; a second pair of diametrically opposed optical elements and a second pair of diametrically opposed mirrors optically associated therewith; all of said optical elements and mirrors being equally spaced about said axis of rotation.

27. The assembly according to claim 26 wherein said first focusing means comprises a fixed second lens.

28. The assembly according to claim 27 wherein said object comprises an indefinite length strip moving in a generally horizontal path at a substantially constant speed, said platform being oriented such that the axis of rotation is aligned with the path of travel of the strip so as to scan each of said laser beams across said strip.

29. The assembly according to claim 28 including means for forming said strip to a arcuate shape in the area adjacent the periphery of said shell such that the laser beam path between said focusing lens and the strip surface remains substantially constant.

30. The assembly according to claim 29 wherein said forming means comprises at least one pair of closely spaced overlying rollers, the upper one of said rollers bearing against the upper surface of the strip and having a circumference at the median portion of the roller greater than the circumference at the extremities of the roller, the lower one of said rollers bearing against the lower surface of the strip and having a circumference at the median portion of the roller less than the circumference at the extremities of the roller, said rollers cooperating to elastically bend the strip to said arcuate shape.

31. The assembly according to claim 22 including a second lens fixedly mounted within each of said laser beam paths between said laser transmitter and the optical element, said second lenses having focal points lying on said axis of rotation.

32. An assembly for repetitively scanning a laser beam across an object comprising:
   at least one fixedly mounted laser transmitter producing a laser beam;
   a mounting platform rotatable about a central axis of rotation;
   means for rotating said platform about said axis; and
   optics means mounted on said platform for focusing said laser beam onto said object including:
   a reflecting mirror;
   an otpcial element positioned within the path of said laser beam between said laser transmitter and said mirror for directing a part at least of said laser beam onto said mirror; and
   a focusing lens positioned within the path of said laser beam between said mirror and said object for focusing said laser beam to a spot on said object,
   said platform comprising a generally cylindrical shell having a peripherally extending mounting surface and a generally cylindrical hub passing axially through said shell, the central axis of said shell and hub coinciding with said axis of rotation, means for rotatably mounting said hub, and first focused beam producing means comprising first and second laser transmitters mounted adjacent one end of said hub, first and second optical elements comprising first and second lenses mounted within said hub and spaced radially from said axis of rotation such that the central axis of said lenses are non-parallel with said axis of rotation, first and second reflecting mirrors angularly mounted within said hub and radially spaced from said axis of rotation, and first and second focusing lenses mounted at spaced positions on said mounting surface, said laser transmitters, lenses and mirrors being arranged such that the beam produced by said first laser transmitter successively traverses as said shell rotates a first optical path including said first lens, first mirror and first focusing lens, and thereafter the beam produced by said second laser transmitter successively traverses as said shell rotates a second optical path comprising said second lens, second mirror and second focusing lens, whereby said beam is successively scanned across said object as said shell rotates, third and fourth optical elements comprising third and fourth lenses mounted within said hub and spaced inwardly from said first and second lenses and radially spaced from said axis of rotation, thrid and fourth reflecting mirrors spaced inwardly from said third and fourth lenses and spaced radially from said axis of rotation, and third and fourth focusing lenses mounted at spaced locations on said mounting surface, said third and fourth lenses and said third and fourth reflecting mirrors being arranged such that the beam produced by said second laser transmitter successively traverses as said shell rotates a third optical path including said third lens, third mirror and third focusing lens, and thereafter traverses a fourth optical path including said fourth lens, fourth mirror and fourth focusing lens, whereby said beams are successively scanned across the object as the shell rotates.

33. The assembly according to claim 32 wherein said focused beam producing means is mounted on said platform to one side of a line passing diametrically through the center of said hub and shell, said assembly further including a second focused beam producing means substantially the same as said first beam producing means mounted on said platform on the opposite side of said line said second beam producing means being rotationally displaced from said first beam producing means.

34. The assembly according to claim 33 wherein each of said focusing lenses comprises a pair of spaced lenses forming a focusing lens assembly to provide a shortened focal length and a higher energy per unit area on the object surface.

35. The assembly according to claim 32 wherein each of said final focusing lenses comprises a cylindrical lens for producing an elliptically shaped focused spot of the object having its longest axis extending in the scan direction.

36. An assembly for repetitively scanning a laser beam across an object comprising:
at least one fixedly mounted laser transmitter producing a laser beam;
a mounting platform rotatable about a central axis of rotation;
means for rotating said platform about said axis; and
optics means mounted on said platform for focusing said laser beam onto said object including:
a reflecting mirror;
an optical element positioned within the path of said laser beam between said laser transmitter and said mirror for directing a part at least of said laser beam onto said mirror; and
a focusing lens positioned within the path of said laser beam between said mirror and said object for focusing said laser beam to a spot on said object,
said optical element comprising a beam splitter for splitting said laser beam into first and second beams, said first beam being directed toward said mirror, a second focusing lens for focusing the second laser beam to a relatively small spot on said object and a second reflecting mirror positioned betweeen said second lens and said beam splitter within the path of said second beam, whereby said optic means rotates with said platform and the focused laser beam emergent from said lens is scanned across said object as said platform rotates.

37. The assembly according to claim 36 wherein said assembly includes mask means positioned between said platform and said object for limiting the area scanned on said object by said laser beam.

38. The assembly according to claim 36 wherein said axis of rotation extends perpendicularly to said object.

39. The assembly according to claim 36 wherein said platform comprises a generally cylindrical shell, the central axis of said shell coinciding with said axis of rotation, means for rotatably mounting said shell, said beam splitter being located on said axis of rotation such that said first and second beams are substantially perpendicular to said axis, said mirrors and said lenses being radially spaced from said axis such that the scanned beams form circular patterns on said object.

40. The assembly according to claim 39 including a plate-like mask extending partially between said platform and said object, said mask being positioned so that semi-circular scanned lines are formed on said object.

* * * * *